United States Patent [19]

Maruyama et al.

[11] Patent Number: 5,867,741
[45] Date of Patent: Feb. 2, 1999

[54] CAMERA FOR IMAGE PICKUP ON FILM AND ALSO FOR ELECTRONIC IMAGE-SENSING

[75] Inventors: Atsushi Maruyama, Sagamihara; Yoji Watanabe, Fuchu; Tsuyoshi Yaji, Kawagoe, all of Japan

[73] Assignee: Olympus Optical Co., Ltd., Tokyo, Japan

[21] Appl. No.: 959,829

[22] Filed: Oct. 29, 1997

[30] Foreign Application Priority Data

Oct. 31, 1996 [JP] Japan ................................ 8-289782
Nov. 14, 1996 [JP] Japan ................................ 8-303305

[51] Int. Cl.⁶ ........................................... G03B 17/24
[52] U.S. Cl. ..................... 396/187; 396/374; 396/429; 348/64
[58] Field of Search ................................ 396/166–170, 396/180, 187, 188, 374, 429; 348/64

[56] References Cited

U.S. PATENT DOCUMENTS 4,742,369  5/1988  Ishii et al. .............................. 396/429

FOREIGN PATENT DOCUMENTS 1-114169  5/1989  Japan .

*Primary Examiner*—David M. Gray
*Attorney, Agent, or Firm*—Louis Weinstein

[57] ABSTRACT

A camera for image pickup on a film and also for electronic image-sensing comprises an electronic image-sensing apparatus having an image sensing device for transforming a subject image into an electric signal, a monitor for displaying the subject image on the basis of an picture signal outputted from this electronic image-sensing apparatus, an apparatus for taking a picture on a film for exposing a silver halide film to the subject image, an image pickup lens for forming the subject image on the image sensing device and the silver halide film, a reflection type of movable mirror for guiding to an optical finder a subject light beam passing through the image pickup lens, and an optical guide, located between the image pickup lens and movable mirror, for guiding to the image sensing device a part of image pickup light beam.

27 Claims, 6 Drawing Sheets

CAMERA FOR IMAGE PICKUP ON FILM AND ALSO FOR ELECTRONIC IMAGE-SENSING

BACKGROUND OF THE INVENTION

1. Field of the Invention

The present invention relates to a camera for image pickup on a film and also for electronic image-sensing, and in particular, a camera for image pickup on a film and also for electronic image-sensing, functioning both as an apparatus for taking a picture on a film that takes an image of a subject on a silver halide film and an electronic image-sensing apparatus that has an image sensing device transforming the image of the subject into an electric signal.

2. Related Background Art

Conventionally, an apparatus for taking a picture on a film (hereinafter called a film camera) that uses a silver halide film is common as an apparatus for recording a subject as a still picture. In addition, as electronic technology has developed, a large number of apparatuses for electronic image-sensing such as digital cameras (hereinafter called digital cameras simply) have been commercialized. Here, the digital cameras each transform an electric signal, photoelectrically transformed from a sensed image of a subject (hereinafter called a subject image) by an image sensing device such as CCD, into a picture signal that is a digital signal. Further, the digital cameras each convert this signal into an image, display this as an image on a display unit such as an electronic view finder comprising an LCD, and record this on a recording medium like a memory device, etc.

These two apparatuses have merits and demerits respectively. Regarding high definition of a recorded image, the film camera is superior to the digital camera. However, the digital camera is superior in the fact that it can be confirmed at the time of image pickup what images were sensed or what their picture quality is. Thus, generally, the film camera can not determine at the time of image pickup whether the image taken on a film is taken in accordance with its photographer's intention.

Then, there are many proposals of cameras mutually supplementing respective demerits, that is, single-lens reflex types of cameras for image pickup on films and for electronic image-sensing. Thus, the cameras each expose a subject image on a silver halide film, and at the same time, guide a part of an image pickup light beam to an image sensing device using a half mirror or the like when this silver halide film is exposed by the light beam. Further, the cameras each fetch a picture signal of the subject, photoelectrically transformed by this image sensing device, as image data, record the image data in a memory medium like memory etc., and display the picture signal of the subject as an image on an electronic view finder or a display screen of a display unit after completion of exposure operation.

For example, Japanese Unexamined Patent Publication. No. 1-114169 discloses the technology of adding to a normal single-lens reflex type of film camera an image confirmation function for confirming a taken picture. Here, the function is added by changing the direction of a light beam of a subject (hereinafter called a subject light beam) with using a mirror interlocking with a shutter, forming the subject image on an image sensing device with an optical system, and sending to a display unit a picture signal generated by the image sensing device.

However, according to the means disclosed in the above-mentioned Japanese Unexamined Patent Publication No. 1-114169, it is possible to confirm the composition at the time of image pickup beforehand. Still, operation of the mirror is extremely complicated, and hence, it is very difficult to actually design it.

In addition, since an embodiment of the above-mentioned Japanese Unexamined Patent Publication No. 1-114169 adopts a transparent type of movable mirror, the light passing through an image pickup lens directly irradiates a shutter shade of a focal-plane shutter. Owing to this, light leakage from the shutter shade may occur, and exposure to a film may occur due to this. In addition, if the light passing through the image pickup lens is intense, shutter strips and the like may burn out. Further, since the above-mentioned Japanese Unexamined Patent Publication No. 1-114169 does not describe components for achieving auto-focusing such as a sensor for the auto-focusing, this invention can not apply to auto-focusing cameras as it is.

Incidentally, regarding a camera for image pickup on a film and for electronic image-sensing that is disclosed in the above-mentioned Japanese Unexamined Patent Publication No. 1-114169 and the like, it is necessary to execute exposure operation to a silver halide film and image-sensing operation to an image sensing device approximately at the same time. Thus, it is necessary to execute steps of the exposure operation to a film and steps of the image-sensing operation to an image sensing device in parallel. The steps of the exposure operation to a film are mirror-up, diaphragm aperture setting, shutter driving, diaphragm aperture opening, mirror-down, shutter charging, and winding of a frame of the film. On the other hand, the steps of the image-sensing operation to an image sensing device are image-sensing with CCD, fetching of analog data, A/D conversion, recording in a memory device, and displaying on a display unit.

However, if the two different operations described above are simply executed in parallel, various malfunctions may occur that are caused by fluctuation of the power supply voltage, motor noises, vibration of movable members, and the like. In particular, if the mirror-up operation or mirror-down operation is performed during integrating operation of the image sensing device, the vibration may cause moving of the taken image, and the motor noise superimposed upon the electronically recorded picture signal may have a bad influence upon the picture signal.

Further, when a memorial picture including a person is taken with a film camera, the person who becomes a subject can not know the exposure timing of the film camera, and hence, the person may accidentally close his (or her) eyes at the time of exposure operation. Consequently, it is frequent that the image is regarded as a failed one. In this case, if the above-mentioned picture confirmation function is added to the camera, the photographer can confirm this failure with using this function, and hence, the photographer can relieve the failure by taking another picture.

However, in this case, if the time lag occurs between the image obtained by the electronic image sensing apparatus and the latent image on the film, the above-mentioned effect can not be obtained, and hence, relief of the failed picture can not be achieved.

SUMMARY OF THE INVENTION

A first object of the present invention is to provide a camera for image pickup on a film and also for electronic image-sensing, which has an image confirmation function for confirming an image at the time of image pickup, the image confirmation function being of simplified construction and low price, in the camera for image pickup on a film and also for electronic image-sensing that has the functions of an apparatus for taking a picture on a film that takes an image of a subject on a silver halide film and an apparatus for electronic image-sensing that has an image sensing device converting the subject image into an electric signal.

In addition, a second object of the present invention is to provide a camera for image pickup on a film and also for electronic image-sensing that has a more secure picture confirmation function by performing the image pickup operation on a film and the image-sensing operation to an image sensing device at the same time.

Further, a third object of the present invention is to provide a camera for image pickup on a film and also for electronic image-sensing that not only can fetch a picture signal with which a fine quality picture can be displayed, but also makes the operation of image pickup on a film and the operation of image-sensing to an image sensing device interlock in the optimum status.

In short, the present invention comprises: an electronic image sensing apparatus having an image sensing device for transforming an subject image into an electric signal; monitor means for displaying the subject image on the basis of a picture signal outputted from this electronic image sensing apparatus; an apparatus for taking a picture on a film for exposing the subject image on a silver halide film; an image pickup lens for forming the subject image on the image sensing device and the silver halide film; a reflection type of movable mirror for guiding a subject light beam passing through the image pickup lens to an optical view-finder; and means, located between the image pickup lens and movable mirror, for guiding a part of the light beam including the subject image (hereinafter called an image pickup light beam) to the image sensing device.

In addition, the above-mentioned camera also comprises control means for controlling the camera so that the image-sensing operation of the image sensing device may be executed after the refuge operation of the movable mirror and the returning operation of the movable mirror may be executed after the completion of this image-sensing operation.

These and other objects and advantages of the present invention will become more apparent from the following detailed description.

According to the present invention, it is possible to provide a camera for image pickup on a film and also for electronic image-sensing that has low manufacturing cost because of simple construction, dissolves various types of conventional malfunctions, and further has an image confirmation function for confirming an image at the time of image pickup, the function having simpler construction and lower price.

Further, according to the present invention, it is possible to provide a camera for image pickup on a film and also for electronic image-sensing that has a more secure picture confirmation function by performing the image pickup operation on a film and the image-sensing operation to an image sensing device at the same time.

Furthermore, in the present invention, the image-sensing operation of the image sensing device is executed after the refuge operation of the movable mirror and the returning operation of the movable mirror is executed after the completion of this image-sensing operation. Therefore, it also possible to provide a camera for image pickup on a film and for electronic image-sensing that can obtain a picture signal with which a fine picture can be displayed without a picture signal being affected by vibration and noises caused by driving of a movable mirror.

DETAILED DESCRIPTION OF THE PREFERRED EMBODIMENTS

Figure 1:
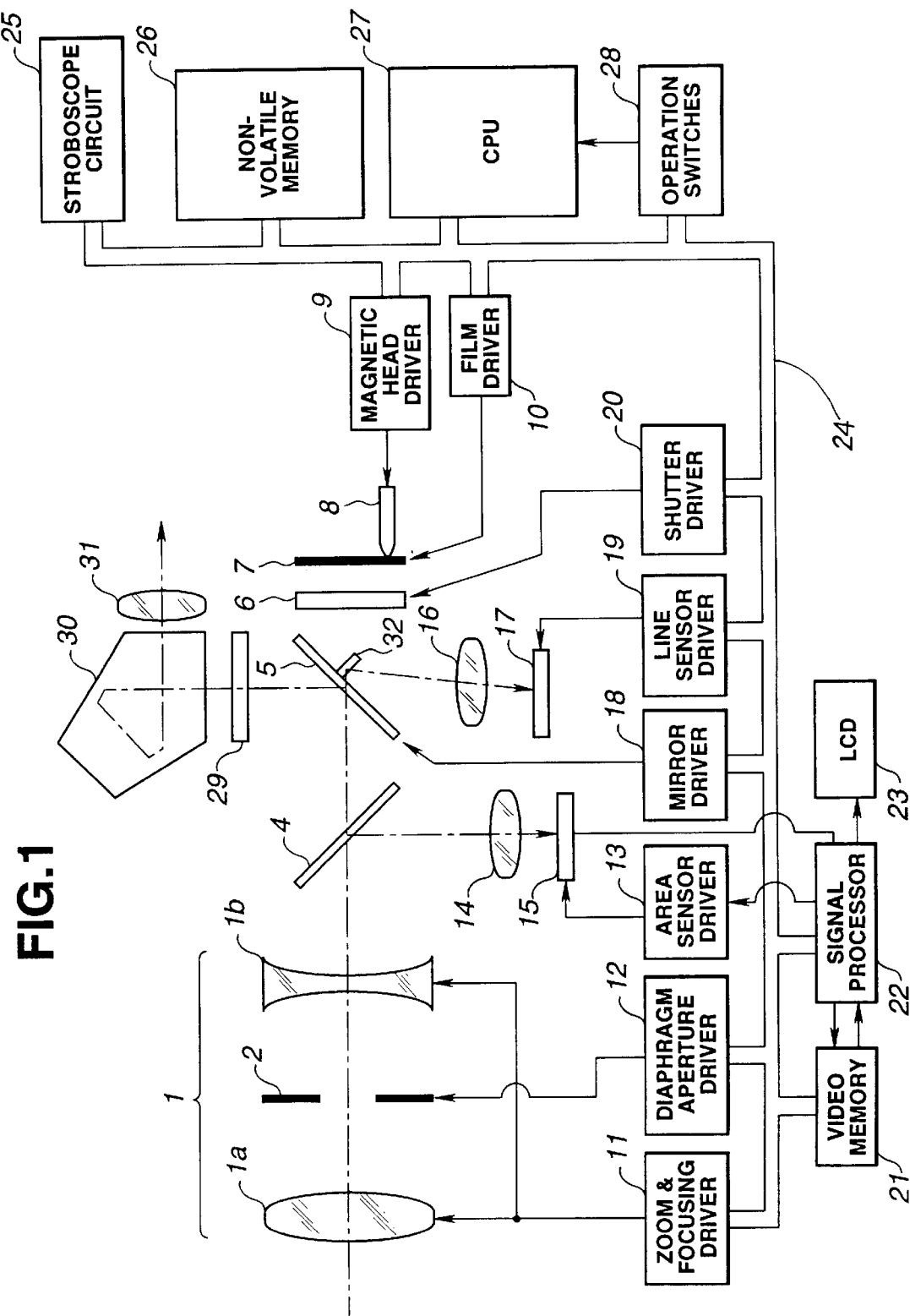
FIG. 1 is a block diagram showing a first embodiment of a camera for image pickup on a film and also for electronic image-sensing according to the present invention.

As shown in FIG. 1, a first embodiment of a camera for image pickup on a film and for electronic image-sensing (hereinafter simply called a camera) is a single-lens reflex camera. In this camera, an image pickup lens 1 for making a subject image formed is composed of a plus lens 1*a* and a minus lens 1*b*, a diaphragm aperture mechanism 2 is located between lenses 1*a* and 1*b*, and this diaphragm aperture mechanism 2 is driven and controlled by a diaphragm aperture driver 12. A half mirror 4 is located behind the minus lens 1*b*, and a part of a subject light beam that is reflected by this half mirror 4 forms an image on an image sensing device (area sensor) 15 through an image-forming lens system 14. In stead of the half mirror 4, a prism or a beam splitter can be used.

The area sensor 15, which is controlled by an area sensor driver 13, transforms the information of the optical subject image formed on the area sensor to an electrical analog signal that is a picture signal, and outputs the picture signal to a signal processor 22 that is an image processing means. This signal processor 22 performs predetermined signal processing including the process for converting the analog signal into a digital signal. This signal processor 22 is connected to video memory 21 and monitor means 23 (hereinafter called an LCD) such as a liquid crystal display unit, and is connected to non-volatile memory 26 and the like through a data bus 24.

The signal processor 22 transfers a picture signal, to which various types of signal processing are performed, to the video memory 21 and non-volatile memory 26, and the picture signal is stored in the video memory 21 and displayed on the LCD 23 as an image.

The non-volatile memory 26 is freely detachable from and attachable to a camera body, can be electrically rewritten, can hold stored picture signals even if the power of the camera body is turned off, and hence is used for recording picture signals.

In addition, with using this analog signal of the area sensor 15, the intensity of the subject is measured, and this analog signal is sent to a CPU 27 through the data bus 24 after the analog signal is digitized by the signal processor 22.

On the other hand, a reflection type of movable half mirror 5, a center portion of which is a half mirror, is provided behind the half mirror 4, and a sub-mirror 32 is provided in the center portion of the back side of this movable half mirror 5 so as to reflect the subject light beam downward. A separator optical system 16 is located in the direction of the reflection optical axis, the system 16 being composed of two optical systems and used for two-image separation. Further, a line sensor 17 is located at the position of forming the subject image by this separator optical system 16, and the line sensor 17 is connected to a line sensor driver 19.

The sub-mirror 32, separator optical system 16, line sensor 17, and the like construct a publicly known focus detection system using a phase difference method. Therefore, the CPU 27 obtains the distance between two images on the basis of a signal inputted via the line sensor driver 19, and calculates a driving amount for driving the image pickup lens 1 to a focused position. A zoom and focusing driver 11 is connected to lenses 1a and 1b of the image pickup lens 1, the driver 11 controlling a driving source for focusing and zooming with driving the image pickup lens 1. Therefore, both lenses 1a and 1b are driven and controlled by the zoom and focusing driver 11. Further, this zoom and focusing driver 11 has encoders (not shown) generating signals corresponding to the movement of respective lenses. Then, the CPU 27 performs focusing on the basis of the calculated driving amount and encoder outputs.

On the other hand, on the reflection optical path of the movable mirror 5, a focusing screen 29, a penta-prism 30, a finder eyepiece optical system 31, and the like are located, which construct an optical view-finder. Thus, since the present embodiment of the camera has the optical view-finder in addition to the LCD 23 used as monitor means for observing the subject, the photographer can take a picture as viewing with the LCD 23. Therefore, in this case, the photographer can stably hold the camera, and hence, the photographer can prevent moving of the camera at the time of image pickup.

The movable mirror 5 is driven by a mirror driver 18, and a focal-plane shutter 6 provided behind the movable mirror 5 is driven by a shutter driver 20. Further, when the movable mirror 5 is raised and the shutter is fully opened, the subject image is formed on the film surface of the silver halide film 7, the film being exposed. Furthermore, on the basis of the information such as the intensity level of the subject outputted from the signal processor 22 and the film speed detected by a film speed detection circuit (not shown) beforehand, the CPU 27 calculates an f-number (f-stop) and a shutter speed. Then, the CPU 27 controls the driving of the shutter 6 using this calculated shutter speed.

A magnetic recording part is formed on the silver halide film 7, and a magnetic head 8 is located so as to contact this magnetic recording part. Magnetic head 8 magnetically records various types of information and is driven by the output of a magnetic head driver 9. Further, a film driver 10 that is a film winding means is provided in the body of the camera, the driver 10 winding the film 7 after image pickup operation for a frame of the film 7 is completed. The magnetic recording by the magnetic head 8 is executed during winding of the film.

Furthermore, the present embodiment of the camera has a stroboscope circuit 25 that is a stroboscope flashing means for illuminating a subject. Hence, if an intensity of the subject is lower than a predetermined intensity, the CPU 27 determines that stroboscope flashing is necessary, controls the stroboscope circuit 25, drives a stroboscope (not shown), and makes the stroboscope flash. The operation switches 28 are composed of a plurality of switches such as operation switches (not shown) of a release operation member and the like, and a switch for detecting the operation of a memory mechanism.

In the above description, the signal processor 22, stroboscope circuit 25, non-volatile memory 26, video memory 21, magnetic head driver 9, film driver 10, shutter driver 20, line sensor driver 19, mirror driver 18, diaphragm aperture driver 12, zoom and focusing driver 11, CPU 27, and the like are electrically connected via the data to bus 24. Hence, they send and receive data one another. Further, the CPU 27 controls the operation of the respective drivers as a whole.

Figure 2:
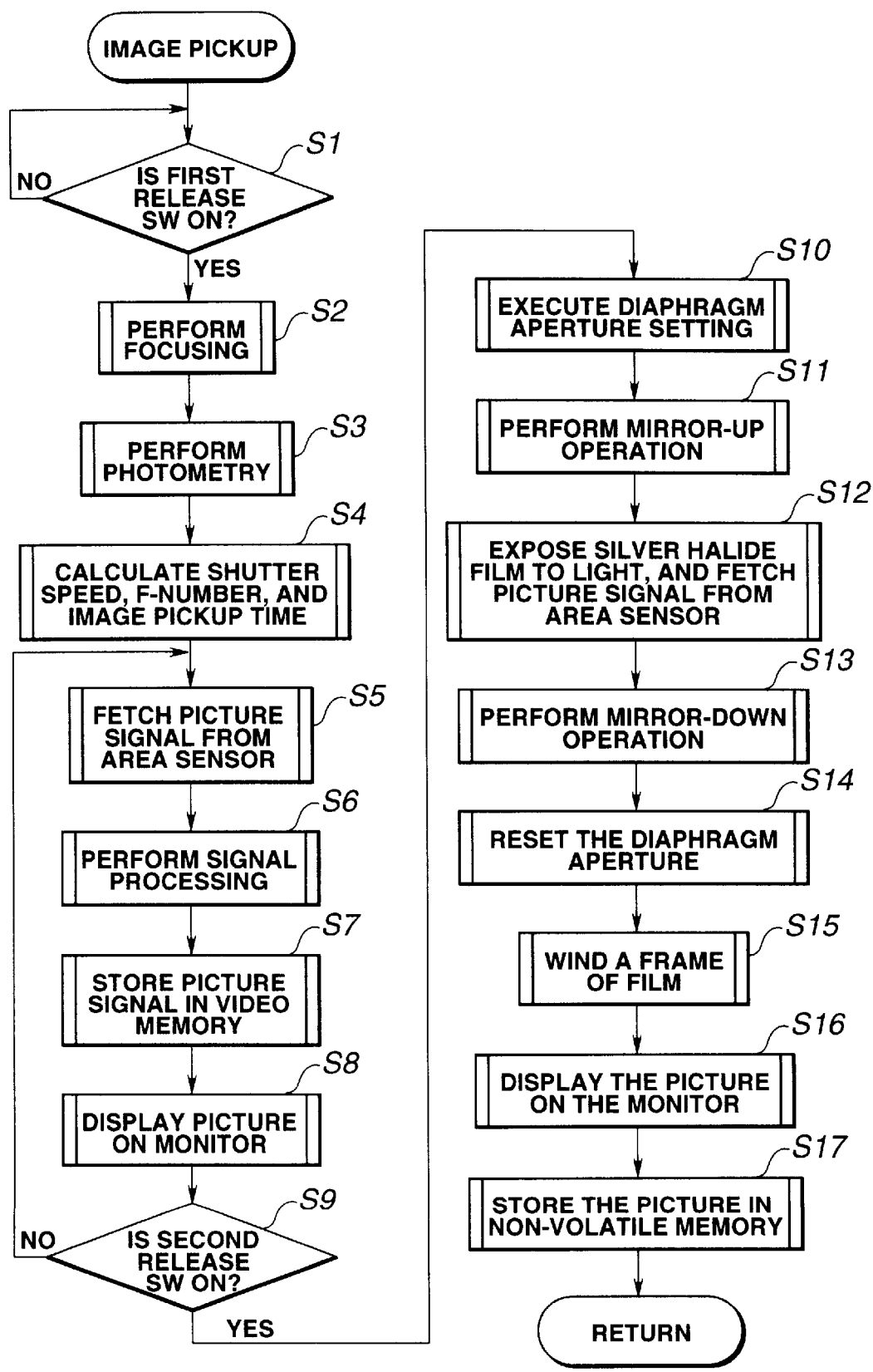
FIG. 2 is a flow chart showing an operation sequence of the camera shown in FIG. 1.

The operation of the present embodiment of the camera constructed in this manner will be described below with reference to the flow chart shown in FIG. 2.

First, when the power of the camera is on, by a first operation to the release operation member (not shown), that is, pushing of the first release at step S1, the process goes to step S2. In addition, a release switch of the present camera is composed of a two-step type of push switch, and hence, the steps are called a first release and a second release in order.

Next, focusing is performed at step S2. In this focusing step, a driving amount to the focused point of the image pickup lens 1 is calculated from the gap between two images on the basis of the output signal of the line sensor 17, and driving of the image pickup lens 1 is controlled. In this time, an absolute distance to the subject is also calculated on the basis of the pulse count of the encoder starting from the reference position (for example, the infinite position) of the image pickup lens 1.

Subsequently, photometry operation is performed at step S3. Here, the intensity of the subject is measured on the basis of the output from the area sensor 15. At the next step S4, a shutter speed and an f-number are calculated on the basis of the information such as the measured photometric value and the film speed detected by a film speed detection circuit (not shown) beforehand. This calculation is performed to obtain an optimum exposure for the apparatus for taking a picture on a film when the exposure operation is performed with a silver halide film. In addition, image pickup time is also calculated by the area sensor 15.

Next, the embodiment of FIG. 1 fetches a picture signal from the area sensor 15 at step S5, and the signal processor 22 performs predetermined signal processing to the fetched picture signal at step S6 and converts the picture signal into digital data. Then, this embodiment stores the digital data in the video memory 21 at step S7, and displays the picture signal on the LCD 23 as an image at step S8.

Then, at step S9, the CPU 27 determines whether the second operation to the release member, that is, pushing of the second release switch is performed. If it is determined that it is not pushed, the process returns to the above-mentioned step S5, and the subsequent steps are repeated.

On the other hand, if the second release switch is pushed at step S9, the process goes to the next step S10, that is, the process moves to the exposure sequence of the apparatus for taking a picture on a film and the image-sensing sequence of the electronic image-sensing apparatus.

Thus, first, at step S10, the diaphragm aperture mechanism 2 is set at the f-number calculated at the above-mentioned step S4. After that, at step S11, the mirror driver 18 performs the mirror-up operation for the movable mirror 5 taking refuge from the optical axis. At the next step S12, the shutter driver 20 controls the shutter 6 so that the shutter speed becomes the value calculated at the above-mentioned step S4, and the silver halide film is exposed to the subject light beam. At the same time, an electronic image is fetched from the area sensor 15. In addition, the above-mentioned exposure sequence will be described later with reference to FIG. 3.

When the exposure operation and image-sensing operation (fetching operation of a picture signal) is completed in this manner, at the next step S13, the movable mirror 5 having previously taken refuge is returned to the former position. Then, at step S14, the diaphragm aperture is reset to drive the diaphragm aperture mechanism 2 to the original position (usually, the fully opened position of the diaphragm aperture). At step S15, the film driver 10 winds a frame of the film 7. In this time, information is magnetically recorded on the magnetic recording part of the film 7 by the magnetic head 8.

Further, at the next step S16, the LCD 23 that is the monitor means displays the image that is stored in and read from the video memory 21. Furthermore, at the next step S17, this embodiment transfers the data stored in the video memory 21, to the non-volatile memory 26 through the data bus 24 and records the data in the non-volatile memory 26. In this manner, a operation sequence is completed (RETURN).

Figure 3:
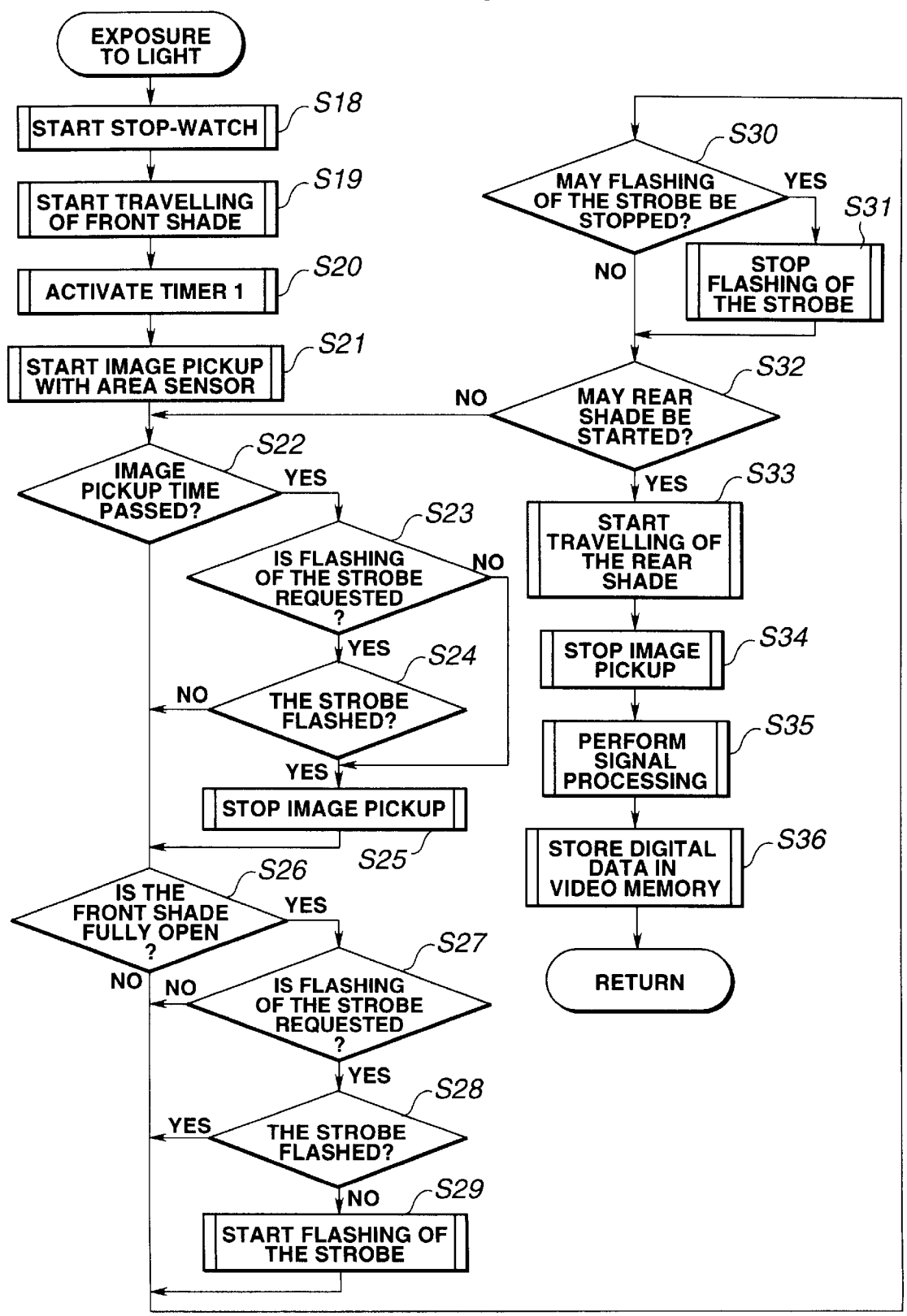
FIG. 3 is a flow chart showing an exposure sequence in the operation sequence shown in FIG. 2.

Next, the above-mentioned exposure sequence will be described below in detail with reference to the flow chart shown in FIG. 3.

When a subroutine "exposure" is called, time measurement with a stop watch in the shutter driver 20 is started first at step S18. Subsequently, at step S19, a front shade of the shutter 6 starts traveling. After a predetermined time (timer 1) has passed at step S20, the area sensor 15 starts image-sensing at step S21. In this manner, the image-sensing of the area sensor 15 starts after the predetermined time passed after the front shade of the shutter 6 had started traveling. Therefore, at the same time as a back edge of the front shade of the shutter 6 crossing the aperture for exposure in the camera, that is, the exposure to the film 7 is starting, the image-sensing of the area sensor 15 also starts. Thus, this embodiment is designed so that the start of timing of the exposure to the silver halide film 7 and that of the charge storage (image-sensing operation) in the area sensor (image sensing device) 15 to coincide with each other.

In this manner, by controlling the start of timing of the exposure to the silver halide film 7 and that of the charge storage (image-sensing operation) in the area sensor (image sensing device) 15, this embodiment does not require members such as a detection switch for determining the start of timing of the charge storage. Therefore, this embodiment has a simplified construction.

Further, it is determined at step S22 whether the predetermined image-sensing time of the area sensor 15, that is, the image-sensing time calculated at the above-mentioned step S4, has passed. If it is determined that the time does not pass, the process goes to step S26. On the other hand, if it is determined that the time passed, it is determined at step S23 whether stroboscope flashing is requested. If it is determined that it is requested, it is determined at step S24 whether the stroboscope flashed. If it has flashed, the area sensor 15 stops the image-sensing operation at step S25.

In addition, if it is determined at step S23 that stroboscope flashing is not requested, the process goes to step S25, where the area sensor 15 stops the image-sensing operation.

Furthermore, it is determined at step S26 whether the shutter 6 is fully opened by the front shade of the shutter 6 passing through the aperture. If it is determined that the shutter is not fully opened yet, the process goes to step S30. If it is determined that the shutter is fully opened, it is determined at step S27 whether the stroboscope flashing is requested. If it is determined that the stroboscope flashing is requested, it is determined at step S28 whether the stroboscope flashed. If it is determined that the stroboscope did not flash, this embodiment starts stroboscope flashing at step S29 by making the stroboscope (not shown) operate through controlling the stroboscope circuit 25.

Next, it is determined at step S30 whether the stroboscope flashing may be stopped. This determination is based on whether the flashing time passed that corresponded to the optimum flashing amount decided from the distance to the subject and the f-number. Here, if it is determined to stop the stroboscope flashing, the stroboscope flashing operation is stopped at step S31.

Then, it is determined at step S32 whether a rear shade of the shutter 6 may start traveling because the stop watch at the above-mentioned step S18 overflows. If it is determined that it may do so, step S33 and the following are executed. If it is determined that it may not do so, the process returns to step S22, and repeats the subsequent steps S23, etc.

If the rear shade starts traveling at step S33, and further, if the area sensor 15 does not stop the image-sensing at step S34, the image-sensing is forced to stop, and the process goes to the next step S35. At step S35, after the predetermined signal processing is performed to the picture signal fetched from the area sensor 15, this processed signal is converted into digital data, which is stored in the video memory 21 at step S36.

As described above, according to the first embodiment having simple and low-cost construction, it is possible to prevent light leakage from the shutter shade of a focal-plane shutter due to intense light passing through the image pickup lens, and also, to prevent burning or damage of the shutter strips due to intense light. Therefore, it is possible to provide a camera for image pickup on a film and for electronic image-sensing, which camera has an image confirmation function and is in low cost without complicating the construction thereof.

In addition, since components for achieving auto-focusing such as a sensor for auto-focusing are also located without complicating the construction of the apparatus, auto-focusing of a camera can be achieved.

Further, time lag does not occur between the picture signal obtained in the electronic image-sensing apparatus and the latent image on a film, regardless of use of a stroboscope. Therefore, it is possible for the image displayed on the LCD 23 and the latent image on a film to completely coincide with each other. Hence, a more secure image confirmation function can be achieved.

Furthermore, if image pickup is performed with using the stroboscope, it is possible to confirm the effect of the stroboscope by displaying the image on the monitor means.

Next, a second embodiment of the camera for image pickup on a film and for electronic image-sensing will be described below. In addition, the present embodiment has a construction approximately similar to that of the first embodiment. Therefore, the same reference codes will be attached to the members similar to those of the first embodiment, and a detailed description of the members will be omitted.

First, the construction of the present embodiment of the camera will be described with reference to the block diagram shown in FIG. 4.

The present embodiment of the camera is controlled by a control circuit (CPU) 27. CPU 27 connects to various driving mechanisms (a lens driving mechanism 11, a diaphragm aperture driving mechanism 12, a mirror driving mechanism 18, a shutter driving mechanism 20, and a film feed mechanism 10) operating according to control signals outputted from output ports of the CPU 27; various detection mechanisms (a lens movement detection mechanism 44, a diaphragm aperture detection mechanism 41, a shutter detection mechanism 42, and a film movement detection mechanism 43) inputting status signals to input ports of the CPU 27; a focus detection mechanism 45 detecting a defocusing amount of a subject; a photometric mechanism 46 detecting an intensity level of the subject; a film information setting mechanism 47 setting a film speed (ISO speed value) and the maximum image pickup frames of a silver halide film 7; and a signal processor 22 that is a signal processing circuit for processing a picture signal nearly equivalent to an optical image recorded on the silver halide film 7, and also, is image processing means including a driver driving an image sensing device 15.

A light beam from the subject passes through the image pickup lens system, and is guided to a focusing screen 29 after being reflected on a main mirror 3, which is a reflection type of movable mirror, is folded upwardly. The subject image formed on the focusing screen 29 is optically observed from a finder eyepiece optical system 31 through a penta-prism 30. In addition, a half mirror 4, that is a light path splitting means for splitting a part of the image pickup light beam is located between the image pickup lens 1 and main mirror 3. Nearly 50% of the subject light beam are is reflected downward by this half mirror 4 and made to enter into an image-sensing device (area sensor) 15 such as a CCD. The image sensing device transforms the subject image on an image forming surface into analog image data. The image processor 22 digital-converts the analog image data from the image sensing device 15 into a digital image data according to a control signal from the CPU 27. Then, the image processor 22 displays the signal on monitor means 23 including an LCD. This image processor 22 and its peripheral circuits will be described later in detail.

The diaphragm aperture mechanism 2 is located between a plus lens 1a and a minus lens 1b making up the image pickup lens 1, the diaphragm aperture mechanism 2 being driven by the diaphragm aperture driving mechanism 12 including a diaphragm aperture driver. When the diaphragm aperture mechanism 2 is driven by the diaphragm aperture driving mechanism 12, the status of the diaphragm aperture setting is detected by the diaphragm aperture detection mechanism 41. Further, the CPU controls driving of the diaphragm aperture according to a signal from the diaphragm aperture detection mechanism 41. In addition, the diaphragm aperture detection mechanism 41 detects the movement of members in the diaphragm aperture driving mechanism 12 connected to the diaphragm aperture mechanism 2 with a noncontact type of sensor such as one of a photointerrupter, a photoreflector, and a Hail element.

The shutter 6 is charged, opened and closed by the shutter driving mechanism 20 including the shutter driver. In addition, the charge status and open/close status of the shutter 6 is detected by the shutter detection mechanism 42, and the CPU 27 controls the charge and open/close operation of the shutter according to a signal from the shutter detection mechanism 42. Further, the shutter detection mechanism 42, Similar to the diaphragm aperture detection mechanism 41, is also composed of a noncontact type of sensor.

Winding and rewinding of the silver halide film 7 is driven by the film feed mechanism 10 that is film winding means including a film driver. Further, the movement of the film is detected by the film movement detection mechanism 43, and hence, the CPU 27 controls the movement of the silver halide film 7 according to a signal from the film movement detection mechanism 43. Furthermore, the film movement detection mechanism 43 detects perforations of the silver halide film with a photointerrupter, a photoreflector, or the like.

The plus lens 1a that is a focusing optical system of the image pickup lens 1 is driven by the lens driving mechanism 11 including the zoom and focusing driver in the above-mentioned first embodiment. In addition, its movement is detected by the lens movement detection mechanism 44, and hence, the CPU 27 controls the movement of the plus lens (focusing optical system) 1a according to a signal from the lens movement detection mechanism 44. Further, the lens movement detection mechanism 44 detects the rotation amount of a comb type of rotation member, provided in a part of a transmitting system for the lens driving mechanism 11, with a photointerrupter (not shown for simplicity).

Figure 4:
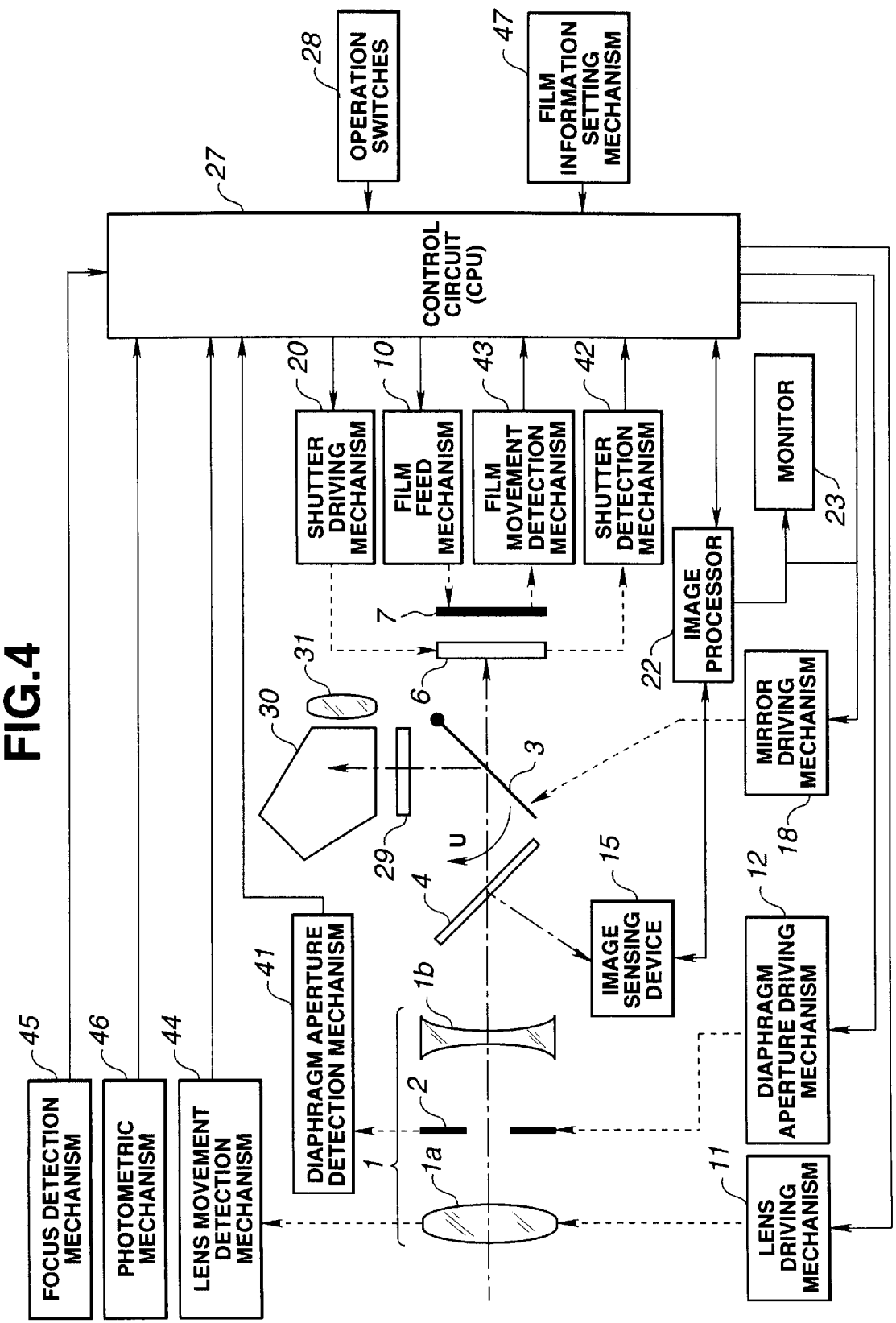
FIG. 4 is a block diagram showing a second embodiment of the camera for image pickup on a film and also for electronic image-sensing according to the present invention.

The main mirror 3 that selectively guides the subject light beam to the finder eyepiece optical system 31 and silver halide film 7 takes refuge to the direction of the arrow U shown in FIG. 4 before the exposure operation. This operation is performed by the mirror driving mechanism 18, including a mirror driver and a motor according to a control signal from the CPU 27. Thus, this mirror driving mechanism 18 plays the role of a first control means that makes the image sensing device 15 perform image sensing after the refuge operation of the movable mirror 5 and makes the movable mirror 5 perform the returning operation after completion of this image-sensing operation.

In addition, the CPU 27 connects to operation switches 28 including switches (all not shown) relating to camera operation such as the first release switch, the second release switch, and a rear lid switch.

Next, the construction and operation of the image processor 22 will be described below in detail.

Figure 5:
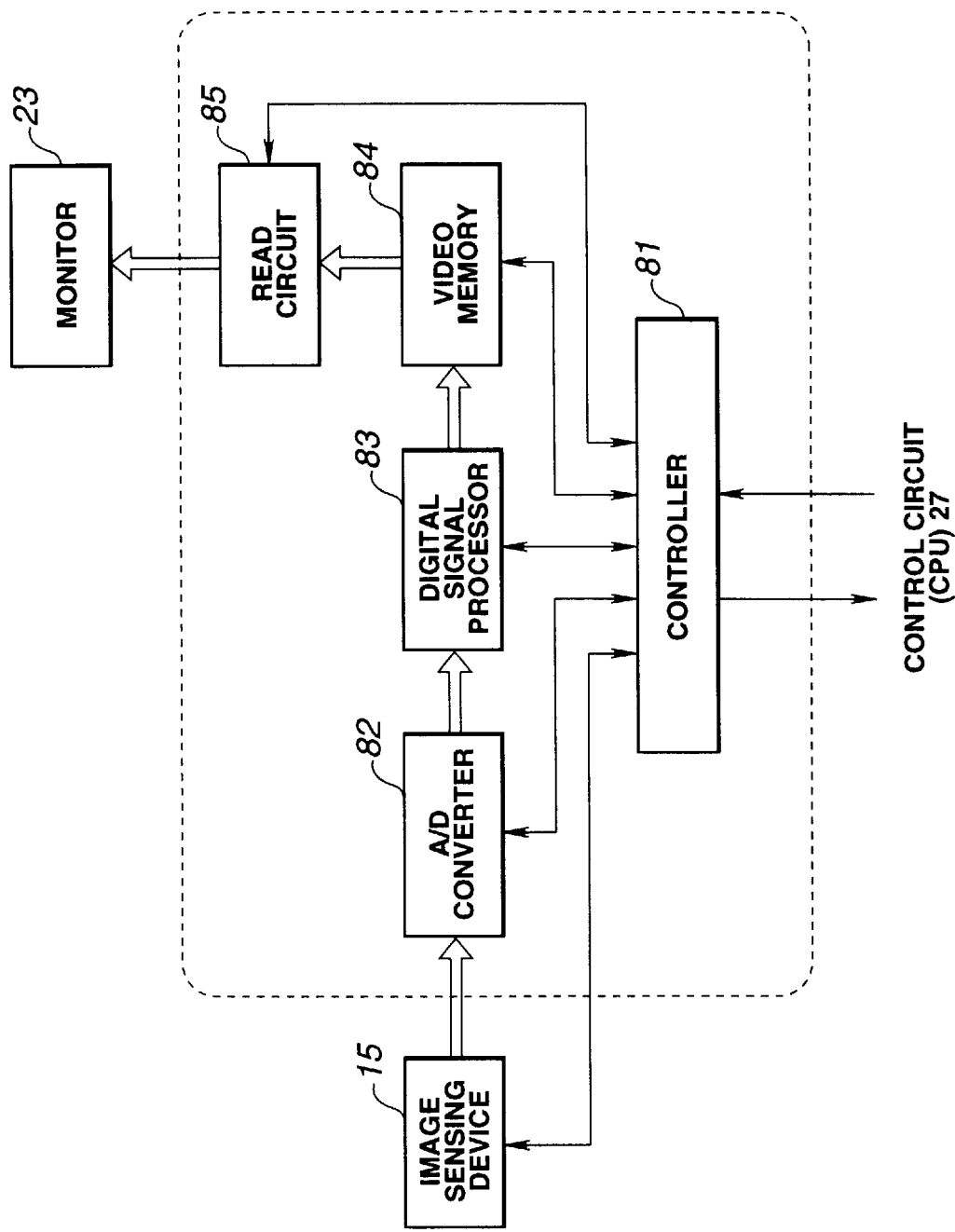
FIG. 5 is a partial block diagram showing an image processor picked up from the camera shown in FIG. 4.

In the block diagram shown in FIG. 5, the image processor 22 enclosed within a dotted line comprises: a controller 81 for controlling a sequence of the driving control of the image sensing device 15, a sequence of image processing, and the like; an A/D converter 82 for converting an analog output of the image sensing device 15 to a digital signal; a digital signal processor 83 for generating an image data suitable to monitor display by processing an output of this A/D converter 82; a video memory 84 for temporarily storing an output of digital signal processor 83; and a read circuit 85 for reading an image data temporarily stored in this video memory 84 and displaying it on a monitor 23.

The controller 81 controls two image processing operations: one is the operation for fetching analog image data; the other is the operation for storing and displaying a digital image data. The above-mentioned fetching operation is to make the image sensing device 15 start an integrating operation according to an image fetching command signal from the CPU 27, and transmit a fetching completion signal to the CPU 27 when the image processor 22 receives an integration completion signal from the image sensing device 15. In addition, the image storage and display operation is to: instruct the A/D converter 82 to perform A/D conversion for the output of the image sensing device 15, according to an image storage and display command signal from the CPU 27; instruct the digital signal processor 83 to perform image data processing for monitor display when receiving an A/D conversion completion signal from the A/D converter 82; make the video memory 84 store an output of the digital signal processor 83 when receiving a process completion signal from the digital signal processor 83; instruct the read circuit 85 to read the image data stored in the video memory 84 and display it on the monitor 23 when receiving a storage completion signal from the video memory 84; and transmit an image storage and display completion signal to the CPU 27 when receiving a display completion signal from the read circuit 85.

In addition, the controller 81 is also a second control means (a second control circuit) making the image processor 22 execute the above-mentioned operation in parallel with the returning operation of the movable mirror 5.

Figure 6:
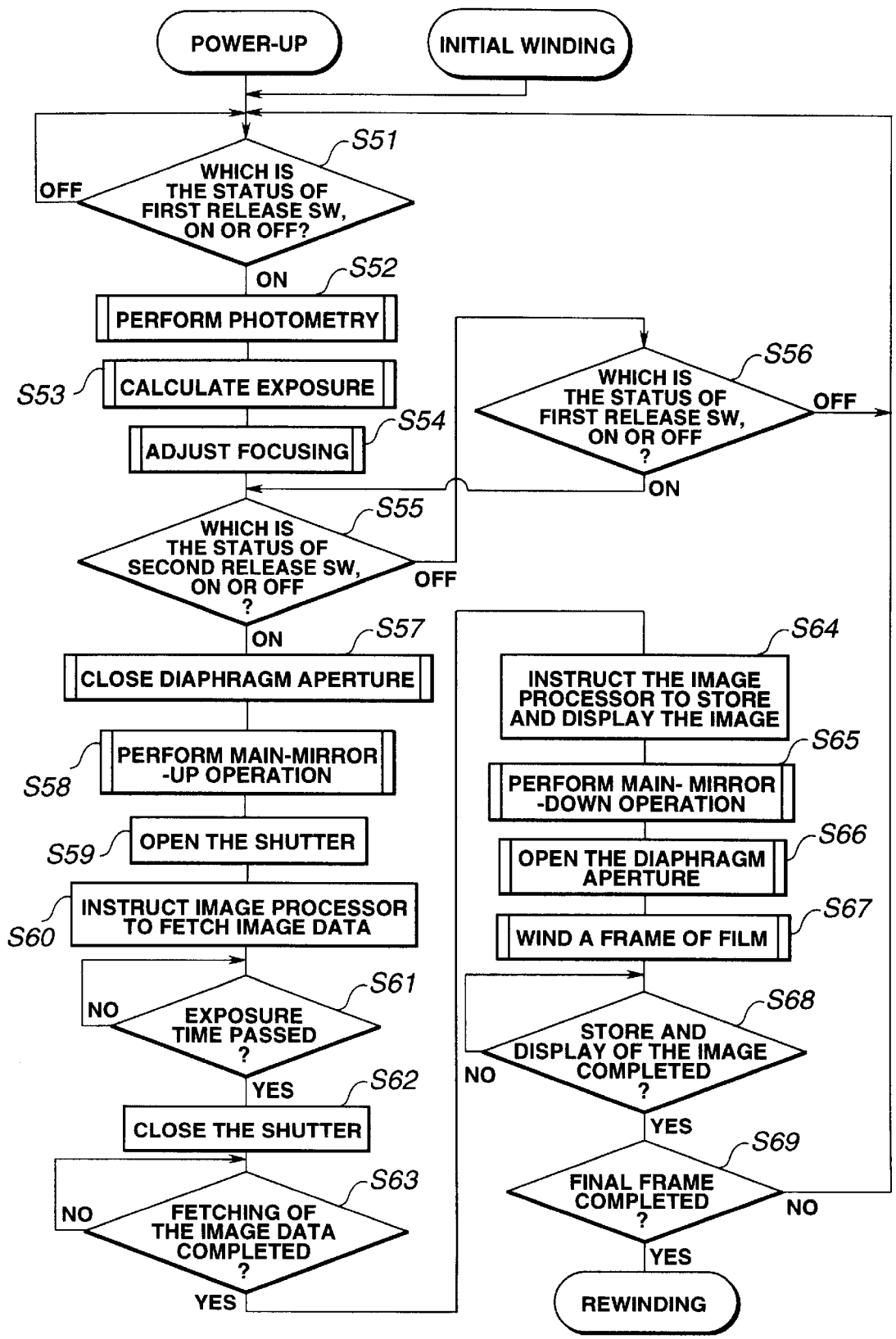
FIG. 6 is a flow chart showing an operation sequence of a control circuit in the camera shown in FIG. 4.

The operation of the present embodiment of the camera constructed in this manner will be described below with reference to the flow chart shown in FIG. 6. In addition, the flow chart in FIG. 6 describes a main operation in the operation of the CPU 27 constructed according to the present embodiment of the camera. Further, the operation based on this flow chart is a sequence executed at the time of turning a power switch on, or initially winding the film in company with loading a film in the camera.

First, the status of the first release switch among the operation switches 28 is checked at step S51, and if it is on, the process goes to step S52, where a subroutine "photometry" is executed. This subroutine is used for getting the intensity information of the subject from the photometric mechanism 46. Next, at step S53, a subroutine "exposure calculation" is executed to calculate an f-number and a shutter speed value, used for obtaining the optimum exposure, from the intensity information of the subject and the information of ISO film speed set by the film information setting mechanism 47.

Subsequently, a subroutine "focusing" is executed at step S54. This subroutine is used for getting the result of focus detection by the focus detection mechanism 45 and guiding the plus lens (focusing optical system) 1a to a focused position by driving the lens driving mechanism 11 on the basis of that information.

After those operations are completed, the status of the second release switch among the operation switches 28 is checked at step S55. Here, if the second release switch is off, the first release switch is checked again at step S56. If the first release switch is kept on at step S56, the process returns to step S55 and repeats checking of the second release switch. However, if the first release switch is off at step S56, the process returns to the above-mentioned step S51.

On the other hand, if it is determined at step S55 that the second release switch is on, the process goes to step S57, where a subroutine "diaphragm aperture closing" is executed. This subroutine is used for making the diaphragm aperture driving mechanism 12 drive the diaphragm aperture mechanism 2 until reaching the f-number obtained in the above-mentioned subroutine "exposure calculation".

After that, a subroutine "main mirror-up" is executed at step S58 for performing the raising operation of the main mirror 3 by driving the mirror driving mechanism 18. Further, when the main mirror is raised, the shutter 6 is opened at step S59 by driving the shutter driving mechanism 20. Subsequently, the CPU 27 sends the image fetching command signal to the image processor 22 at step S60. Furthermore, although the image processor 22 performs the above-mentioned fetching operation of an analog image data according to this signal, the process goes to step S61 without the CPU 27 waiting the fetching completion signal from the image processor 22. The CPU 27 waits passing of the exposure time calculated in the above-mentioned subroutine "exposure calculation," and if the time has passed, the CPU 27 preferentially executes at step S62 the work of returning the shutter 6 closed. Therefore, even if the fetching completion signal is transmitted from the image processor 22 during that period, the CPU 27 never responds to that.

After the shutter is closed at step 62, the CPU 27 checks the presence of the fetching completion signal from the image processor 22 at step S63. Generally, the integration of the image sensing device 15 is completed during the measurement of the exposure time and the shutter closing operation, and hence, this check becomes frequently meaningless. However, it is conceivable that the measurement of the exposure time is completed before the completion of the integrating operation, depending on the combination of the ISO film speed and f-number. If the mirror-down operation is started in this time, an image displayed on the basis of a picture signal may not be clear due to the vibration and noise from the main mirror and mirror driving mechanism 18. Therefore, the fetching completion signal is checked at step S63 so as not to be able to move to the next mirror-down operation until the integrating operation of the image sensing device 15 is completely finished. Thus, it is prevented that an image becomes unclear and noise is superimposed on image data, by prohibiting the image-sensing operation of the image sensing device 15 during the operation of the motor that may cause such vibration or noise.

After confirming this fetching completion signal, the CPU 27 sends the image storage and display command signal to the image processor 22 at step S64. Subsequently, the subroutine for performing the mirror-down operation of the main mirror 3 is executed at step S65, and a subroutine "diaphragm aperture opening" is executed at step S66 for returning the diaphragm aperture mechanism 2 open. Then, a subroutine "one-frame winding" is executed at step S67. In this subroutine, a frame of the silver halide film 7 is wound by the film feed mechanism 10.

The image processor 22 performs the A/D conversion, storage, and display of the fetched image while steps 65–67 are executed according to the image storage and display command signal transmitted at the above-mentioned step S64. After completion of these steps, the image processor 22 transmits the image storage and display completion signal to the CPU 27. The CPU 27 checks transmission of this signal at step S68 when the subroutine "one-frame winding" is completed. Although this check, similarly to the check of the fetching completion signal, is also substantially unnecessary, a fault regarding this sequence does not occur owing to this check even if the completion timing of both operations is reversed due to a certain cause.

After the image storage and display completion signal is confirmed at step S68, the process goes to the next step S69. Here, the CPU 27 compares the maximum image pickup frames set by the film information setting mechanism 47 to an exposed frame number. If they coincide with each other, it is determined that the film is exposed until the final frame, and the process goes to "rewinding." If not, the process returns to step S51.

As described above, according to the above-mentioned second embodiment, the integrating operation of the image sensing device 15 is performed between the mirror-up and mirror-down operations of the main mirror 3. Therefore, it is prevented that an image becomes unclear due to movement caused by the vibration generated at the time of mirror driving and noise is superimposed on image data due to the noise generated at the time of motor driving and the power fluctuation.

In addition, the operation of the image processor 22 is executed in parallel between the start of the returning operation of the main mirror 3 and the completion of rewinding operation by the film feed mechanism 10. Therefore, continuous image pickup operation can be performed at high speed.

Further, if the A/D conversion operation is also easily affected by motor noise, the A/D conversion operation may be also performed with the CCD integrating operation between the mirror-up operation and the mirror-down operation.

Furthermore, by further providing interface means for outputting the image data processed by the image processor 22 to the outside, it is possible to output the image data to an information processing apparatus such as a personal computer with using this means. Hence, it is possible for this information processing apparatus and the like to secondarily use the image data, for example, to correct and/or display the image data.

In this manner, according to the above-mentioned second embodiment, it is possible not only for a camera having the monitor means for confirming the subject image to fetch a picture signal with high quality, but also to provide a camera for image pickup on a film and also for electronic image-sensing in which the image pickup operation to a film interlocks with the image-sensing operation to an image sensing device in the optimum status.

In the present invention, it is apparent that it is possible to construct embodiments different in a wide range according to the present invention without departing from the spirit and scope thereof. The scope of the present invention should not limited to the embodiments described and should instead be defined by the accompanying claims.

What is claimed is:

1. A camera for image pickup on a film and for electronic image-sensing comprising:
   an electronic image-sensing apparatus having an image sensing device for transforming a subject image into an electric signal;
   monitor means for displaying said subject image based on a picture signal outputted from said electronic image-sensing apparatus;
   an apparatus for taking a picture on a film for exposing a silver halide film to said subject image;
   an image pickup lens for forming the subject image on said image sensing device and said silver halide film;
   a reflection type movable mirror for guiding to an optical finder a subject light beam passing through said image pickup lens; and
   means, located between said image pickup lens and said movable mirror, for guiding to said image sensing device a part of image pickup light beam.

2. A camera for image pickup on a film and also for electronic image-sensing according to claim 1, wherein said camera has a focal plane shutter between said movable mirror and said silver halide film and said image sensing device starts an image-sensing operation a predetermined time after a front shade of said focal plane shutter has started traveling.

3. A camera for image pickup on a film and also for electronic image-sensing according to claim 2, wherein said predetermined time is a period when the front shade starts traveling and arrives at an aperture for exposure.

4. A camera for image pickup on a film and also for electronic image-sensing according to claim 2, wherein said camera further has stroboscope flashing means and wherein said stroboscope flashing means starts a flashing operation after said image sensing device has started an image-sensing operation and the front shade of said focal plane shutter has completed traveling.

5. A camera for image pickup on a film and also for electronic image-sensing according to claim 1, wherein means for guiding a part of said image pickup light beam to said image sensing device is a half-mirror.

6. A camera for image pickup on a film and also for electronic image-sensing according to claim 1, wherein means for guiding a part of said image pickup light beam to said image sensing device is a prism.

7. A camera for image pickup on a film and also for electronic image-sensing according to claim 1, wherein means for guiding a part of said image pickup light beam to said image sensing device is a beam splitter.

8. A camera for image pickup on a film and also for electronic image-sensing according to claim 1, wherein said camera has a release operation member and said subject image is displayed on said monitor means based on said picture signal outputted from said electronic image-sensing apparatus by operating a first step of the release operation member.

9. A camera for image pickup on a film and also for electronic image-sensing according to claim 1, wherein said camera has a release operation member and a charge storage by said image sensing device starts a predetermined time after exposure to a silver halide film has started by operating said release operation member.

10. A camera for image pickup on a film and also for electronic image-sensing according to claim 1, wherein image-sensing time by said image sensing device is calculated beforehand at a time of photometry of the subject image based on intensity of the subject.

11. A camera for image pickup on a film and also for electronic image-sensing according to claim 1, wherein a shutter speed and an f-number in said apparatus for taking a picture on a film is calculated beforehand based on intensity of the subject that is measured from an output of said image sensing device.

12. A camera for image pickup on a film and also for electronic image-sensing according to claim 1, wherein, if an image is taken in combination with a stroboscope, said camera completes charge storage by said electronic image-sensing apparatus after the stroboscope completes flashing.

13. A camera for image pickup on a film and also for electronic image-sensing according to claim 1, wherein said camera has control means for making said image sensing device perform an image-sensing operation after said movable mirror unblocks a light path to enable light from an image to reach said film and making said movable mirror perform a returning operation to block said light path after said image-sensing operation.

14. A camera for image pickup on a film and also for electronic image-sensing according to claim 1, wherein said camera has a first control means for making said image sensing device perform an image-sensing operation after said movable mirror unblocks a light path to enable light from an image to reach said film and making said movable mirror perform a returning operation to block said light path after said image-sensing operation is completed and a second control means for making said image processing means perform an operation in parallel with a returning operation of said movable mirror.

15. A camera for image pickup on a film and also for electronic image-sensing comprising:
   an image pickup lens for forming a subject image on a silver halide film;
   a shutter for exposing said silver halide film to said subject image for a predetermined time;

a reflection type movable mirror, located between said shutter and said image pickup lens, for guiding to an optical finder a subject light beam passing through said image pickup lens;

an image sensing device for transforming the subject image into a picture signal; and light path splitting means, located between said image pickup lens and said movable mirror, for splitting toward said image sensing device a part of an image pickup light beam.

16. A camera for image pickup on a film and also for electronic image-sensing comprising:

an electronic image-sensing apparatus having an image sensing device for transforming a subject image into an electric signal;

monitor means for displaying said subject image based on a picture signal outputted from said electronic image-sensing apparatus;

an apparatus for taking a picture on a film for exposing a silver halide film to the subject image;

stroboscope flashing means for irradiating a subject; and means for controlling charge storage of the image sensing device and completing charge storage of said image sensing device after said stroboscope flashing means has completed irradiation when said subject is irradiated by said stroboscope flashing means.

17. A camera for image pickup on a film and also for electronic image-sensing according to claim 16, wherein said charge storage control means continues said charge storage operation if flashing is not completed in spite of request of stroboscope flashing when image-sensing time passed after said image sensing device had started charge storage.

18. A camera for image pickup on a film and also for electronic image-sensing according to claim 16, wherein said camera has a shutter comprising a front shade and a rear shade and said stroboscope flashing means starts flashing when said front shade is fully opened and stroboscope flashing is requested.

19. A camera for image pickup on a film and also for electronic image-sensing according to claim 16, wherein said camera transforms a subject image into an electric signal with synchronizing with exposure operation to said silver halide film.

20. A single-lens reflex camera exposing a silver halide film to a subject image, simultaneously transforming said subject image to an electric signal, and displaying said subject image on a monitor, characterized in that a part of a subject light beam is guided to an image sensing device, used for transforming said subject light beam into said electric signal, along a light path from an image pickup lens for forming said subject image to a movable mirror for guiding the subject light beam into an optical finder for observing the subject image.

21. A single-lens reflex camera according to claim 20, wherein said camera has a control circuit for making said image sensing device perform an image-sensing operation after said movable mirror unblocks a light path enabling light from an image to reach the film and making said movable mirror perform a returning operation to block the light path after the image-sensing operation is completed.

22. A single-lens reflex camera according to claim 20, wherein said camera has a first control means for making said image sensing device perform image-sensing operation after said movable mirror unblocks a light path enabling light from an image to reach the film and making said movable mirror perform a returning operation to block said light path after the image-sensing operation is completed and a second control means for making said image processing means perform an operation in parallel with a returning operation of said movable mirror.

23. A single-lens reflex camera exposing a silver halide film to a subject image, simultaneously transforming the subject image to an electric signal, and displaying the subject image on monitor means, characterized in that said camera starts an image-sensing operation with the image sensing device for transforming an image pickup light beam into said electric signal a predetermined time after a front shade of a shutter has started traveling.

24. A single-lens reflex camera exposing a silver halide film to a subject image, simultaneously transforming the same subject image to an electric signal, and displaying the subject image on monitor means, characterized in that said camera starts flashing of a stroboscope flashing means for irradiating the subject image after a front shade of a shutter has completely finished traveling and also stops image-sensing operation of said image sensing device after said stroboscope flashing means has stopped flashing.

25. A single-lens reflex camera comprising a movable mirror that moves away from an image pickup light path before an exposure operation and returns to block said path after completion of the exposure operation, a film winding mechanism that winds a film after said exposure operation, a half mirror located in the image pickup light path for reflecting a part of an image pickup light beam, an image sensing device that senses a subject image by receiving the light beam reflected by said half mirror, an image processor for generating a digital picture signal from an output signal of said image sensing device, and monitor means for displaying said digital image, the single-lens reflex camera characterized in that said single-lens reflex camera starts an image-sensing operation of said image sensing device after said movable mirror moves away from said path, starts a returning operation of said movable mirror after completion of said image-sensing operation, and simultaneously executes operation of said image processor between a start of a returning operation of said movable mirror and completion of a winding operation by said film winding mechanism.

26. A camera that senses a subject image by an image sensing device synchronously with an exposure operation to a silver halide film and displays image-sensing data on a screen of a monitor means, said camera being a single-lens reflex camera comprising:

a motor driving a mechanism of said camera; and a control circuit preventing an image-sensing operation of said image sensing device during operation of said motor.

27. A single-lens reflex camera that senses a subject image by an image sensing device synchronously with an exposure operation to a silver halide film and displays image-sensing data on a screen of a display part, the single-lens reflex camera comprising:

a motor driving a mechanism of said camera;

a beam-splitting device, located in an image pickup light path, for beam-splitting a part of an image pickup light beam;

an image sensing device sensing a subject image by receiving the light beam beam-split by said beam-splitting device;

an image processor generating a digital image from an output of said image sensing device;

a display part for displaying said digital image; and a control circuit preventing an image-sensing operation of said image sensing device during operation of said motor.

* * * * *